United States Patent
Brown et al.

[15] 3,656,803
[45] Apr. 18, 1972

[54] TRACTOR ROLL BAR

[72] Inventors: Clarence Edward Brown; Norman Frederick Lemmon, both of Cedar Falls, Iowa

[73] Assignee: Deere & Company, Moline, Ill.

[22] Filed: Aug. 27, 1970

[21] Appl. No.: 67,422

[52] U.S. Cl. .................................................. 296/102
[51] Int. Cl. .................................................. B62d 25/06
[58] Field of Search .............. 296/102, 29, 30, 43; 52/731, 52/732

[56] References Cited

UNITED STATES PATENTS

| | | | |
|---|---|---|---|
| 3,455,598 | 7/1969 | Tweedy | 296/102 |
| 2,579,774 | 12/1951 | Akey | 52/731 |

*Primary Examiner*—Benjamin Hersh
*Assistant Examiner*—Robert R. Song
*Attorney*—H. Vincent Harsha, Harold M. Knoth, William A. Murray, John M. Nolan and Raymond L. Hollister

[57] ABSTRACT

A tractor roll bar has a pair of generally upright box beam members disposed on opposite sides of the operator's station with the lower ends of the box beam members rigidly attached to the axle housings for the rear drive wheels. The upper ends of the box beam members are connected by a transverse beam generally above the operator's seat. Each upright box beam member has an elongated, longitudinally extending plate welded to the interior side of one of the lateral sides of one of the box beam members and projecting toward and spaced from the opposite, the plates engaging the opposite side to limit lateral buckling of the upright box beam members during a side rollover of the tractor.

6 Claims, 2 Drawing Figures

PATENTED APR 18 1972

3,656,803

*INVENTORS*
CLARENCE E. BROWN
NORMAN F. LEMON

TRACTOR ROLL BAR

BACKGROUND OF THE INVENTION

This invention relates to an improved tractor roll bar of the type shown in U. S. Pat. No. 3,455,598.

The roll bar disclosed in said patent is of relatively simple construction and comprises a pair of parallel, generally upright, tapered box beam members having their lower ends rigidly attached to the rear drive wheel axle housings on opposite sides of the operator's seat, the upper ends of the upright members being connected by a transverse beam approximately directly over the operator's head. This type roll bar structure has achieved relatively wide acceptance on U. S. agricultural tractors.

The upright members are generally made of steel channels welded into a box beam, so that the upright members have a rectangular cross section. The fore-and-aft width of the beams generally decreases upwardly, while the transverse width remains constant, so that the beams generally taper upwardly in only a fore-and-aft direction. It has been found, that during a side rollover of the tractor, there has been considerable localized buckling in a lateral direction in the lower portion of the upright beams, primarily because the beam is stressed a greater amount adjacent its lower end, while it has a relatively constant transverse dimension. During the localized buckling, the two opposite lateral side walls of the beam collapse together, and since, during such a localized buckling, a relatively small volume of material is undergoing plastic strain, the beam is capable of absorbing less energy than if the buckling were spread over a relatively large zone. Of course, one answer is to increase the size of the beam, although this solution increases both the weight and the cost of the roll bar.

SUMMARY OF THE INVENTION

According to the present invention, an improved roll bar structure is provided, wherein the roll bar resists the localized buckling of the upright roll bar members during a lateral rollover of the tractor, without appreciably increasing the size and cost of the upright roll bar members.

More particularly, an elongated, longitudinally extending plate is provided in the interior portion of each upright box beam member, the plate being attached to one side wall of the box beam member and extending toward the opposite side wall, so that after a predetermined amount of localized buckling, the plate engages the opposite side wall to limit the localized buckling and spread the strain on the beam over a larger area, thereby increasing the energy-absorbing capacity of the roll bar.

DESCRIPTION OF THE PREFERRED EMBODIMENT

Figure 1:
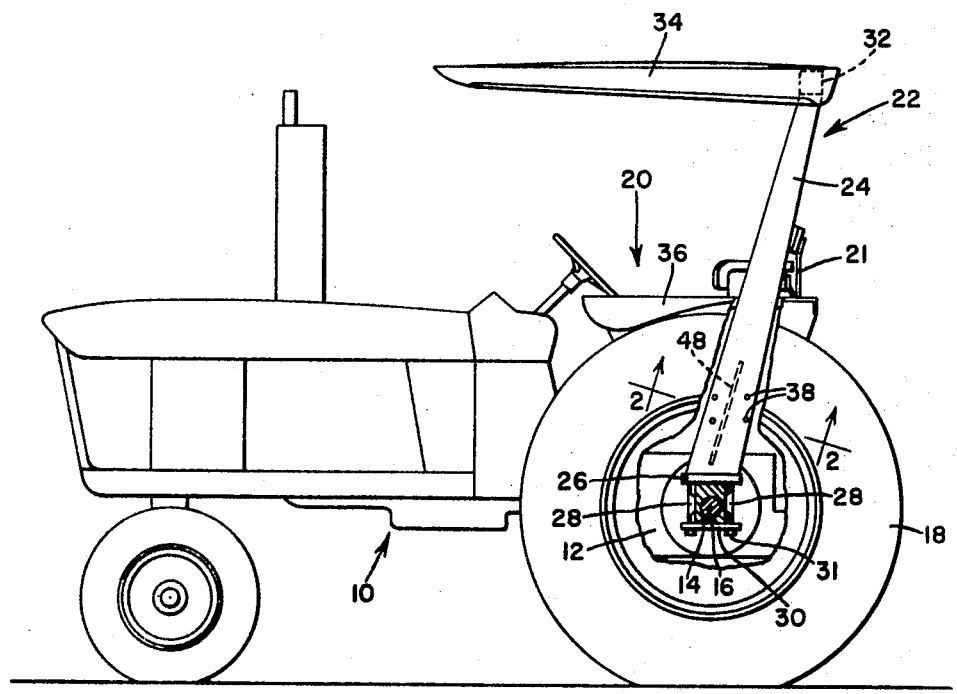
FIG. 1 is a left side elevational view of a tractor equipped with the improved roll bar structure and a canopy attached thereto, a portion of the left wheel and fender of the tractor being broken away to more clearly show the roll bar.

The improved roll bar is illustrated on a typical agricultural tractor, which is described in greater detail in U. S. Pat. No. 3,455,598. The tractor includes a fore-and-aft body or main frame 10 having a rearward transmission housing 12 with a pair of transversely extending axle housings 14 projecting from the opposite sides of the transmission housing 12. The axle housings have a generally square cross section and house transversely extending rear axles 16 which drive the rear drive wheels 18 of the tractor. An operator's station, indicated in its entirety by the numeral 20, is disposed between the rear wheels 18 above the transmission housing 12 and includes a seat 21 mounted on top of the transmission housing 12. An inverted U-shaped roll bar structure, indicated in its entirety by the numeral 22, has its opposite ends respectively attached to the opposite axle housings 14 and surrounds the seat 21 to protect a seated operator in the event of a tractor rollover. The general construction of a roll bar structure 22 and the manner in which it protects the operator is described in greater detail in said U. S. Pat. No. 3,455,598.

As described in said patent, the roll bar structure includes a pair of parallel, generally upright box beam members 24 having their lower ends respectively attached to the opposite axle housings 14. Although only the left side box beam member 24 is illustrated in the drawing, it is to be understood that the right side member 24 is substantially identical to the left side member. The members 24 are slightly upwardly and rearwardly inclined and taper inwardly and upwardly in a fore-and-aft direction only, the lower ends of the members having a substantially greater fore-and-aft dimension than the upper ends. Each box beam member 24 is provided with a horizontal plate 26 at its lower end, the plates 26 engaging the horizontal upper surfaces of the axle housings 14 and being removably clamped thereto by a number of bolts 28 which extend downwardly through the plates 26 along both the front and rear sides of the axle housings and through horizontal clamping plates 30, which are parallel and opposite to the plates 26 and engage the underside of the axle housings. As is apparent, when nuts 31 are tightened on the bolts 28 below the clamping plates 30, the axle housings are clamped between the respective plates 26 and 30 so that the box beam members 24 are rigidly attached to the axle housings.

The upper ends of the box beam members 24 are connected by a transverse beam 32 above the seat 21 and, a canopy 34 is attached to and extends forwardly from the transverse beam 32 in cantilevered fashion. A pair of fenders 26 are removably attached to the outer sides of the box beam members 24 between the beams and the respective rear wheels 18 by means of bolts removably threadable into tapped holes 38 in the box beam members 24.

Figure 2:
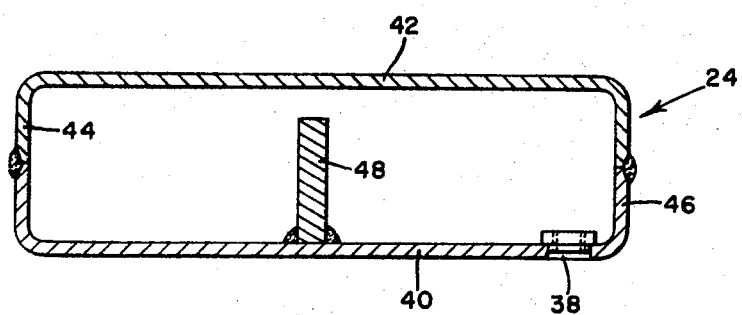
FIG. 2 is a section of the upright beam member of the roll bar as viewed generally along the line 2—2 of FIG. 1.

The construction of the box beam members is shown in greater detail in FIG. 2, which is an enlarged section of one of the members. As is apparent, the box beam members have a generally rectangular cross section with wider outer and inner lateral side walls 40 and 42, respectively, and narrower front and rear side walls 44 and 46, respectively. Since the transverse dimension of the beam members is constant, the front and rear side walls have the same width throughout the length of the beam members, while the lateral side walls 40 and 42 are substantially wider at their lower end than a their upper end. The beams are formed by welding together a pair of opposite steel channels, the welds extending along the center of the front and rear side walls 44 and 46.

Welded to the interior side of the outer side wall 40 of each box beam member 24 is an elongated buckle control member or plate 48, which extends longitudinally within the lower portion of each box beam member approximately centrally between the front and rear side walls 44 and 46. As is apparent, the buckle control member or plate 48 is welded along its edge and projects transversely or laterally toward the opposite side wall 42. The edge of the buckle control plate opposite the welded edge is spaced a relatively short distance from the inner side wall 42. As best seen in FIG. 1, the lower end of the buckle control member or plate 48 is adjacent to the lower end of the box beam member 24, while the upper end is approximately one-fourth the way up the member. Thus, the buckle control members or plates 48 are disposed within the lower portion of the upright box beam members 24, which is the area of highest stress during a rollover. The mounting holes 38 for the fenders 36 also provide an area of localized stress which is counteracted by the buckle control plates.

In operation, during a lateral tractor overturn, a transverse force is exerted on the upper portion of the upright box beam members 24, which tends to deflect the beam members laterally, and, when the force is large enough, the beam starts to buckle, generally in the lower portion of the beam members where the buckle control plates are disposed. When localized buckling occurs, the opposite walls of the beam members start to collapse together at the buckling point. After the beam has collapsed a distance equal to the normal gap between the edge of the buckle control plate 48 and opposite side wall 42, the buckle control plate engages the opposite side wall to limit further buckling in that area, so that any additional buckling occurs at a different locality. The larger area of plastic strain produces a greater energy abosorption in the beam member, so that a given size beam can endure a considerably greater stress without collapsing to the point that the operator would be endangered.

We claim:

1. In a tractor having a main tractor frame including a rearward transmission housing and a pair of axle housings extending transversely from opposite sides of the transmission housing with a pair of wheels disposed at the outer ends of the axle housings, an operator's station between the wheels and above the transmission housing, the combination therewith of an improved operator protective frame comprising: a pair of generally upright box beam members disposed on opposite sides of the operator's station and having their lower ends respectively attached to the opposite axle housings; an elongated, longitudinally extending buckle control member rigidly attached to one of the lateral sides of each upright box beam member interiorly thereof and projecting toward and spaced from the opposite lateral side of the box beam member said buckle control member being engageable with said opposite lateral side after a predetermined amount of buckling of the box beam member to limit the buckling thereof; and a transverse horizontal beam member disposed above the operator's station and connected to the upper end of the upright beam members.

2. The invention defined in claim 1 wherein each buckle control member comprises a generally upright transverse plate disposed within the box beam member with one lateral edge attached to said one lateral side and its other lateral edge spaced from said opposite lateral side.

3. The invention defined in claim 2 wherein the lower portion of each upright box beam member is rectangular in cross section with the opposite lateral sides substantially wider than the front and rear sides, the buckle control member plate being disposed in the lower portion of the box beam members and approximately centrally disposed between the front and rear side.

4. The invention defined in claim 3 wherein the box beam members are fabricated from a pair of opposite channel-shaped members with the edges welded together, the buckle control member plate being secured to the bight portion of one of the channels.

5. The invention defined in claim 2 wherein the buckle control member plates are attached to the outer lateral sides of the upright box beam members and extend toward the inner sides.

6. In a vehicle having a chassis, the combination therewith of an improved operator protective frame comprising at least one upright elongated, hollow beam member having opposite sides, a longitudinally extending buckle control plate having one edge rigidly attached to one of the sides and projecting laterally therefrom, and its opposite edge spaced from the opposite side, said buckle control plate being engageable with said opposite side after a predetermined amount of buckling of the member opposite said plate to limit the buckling of the member at said location and means for attaching the beam member to the chassis.

* * * * *